Patented Aug. 18, 1936

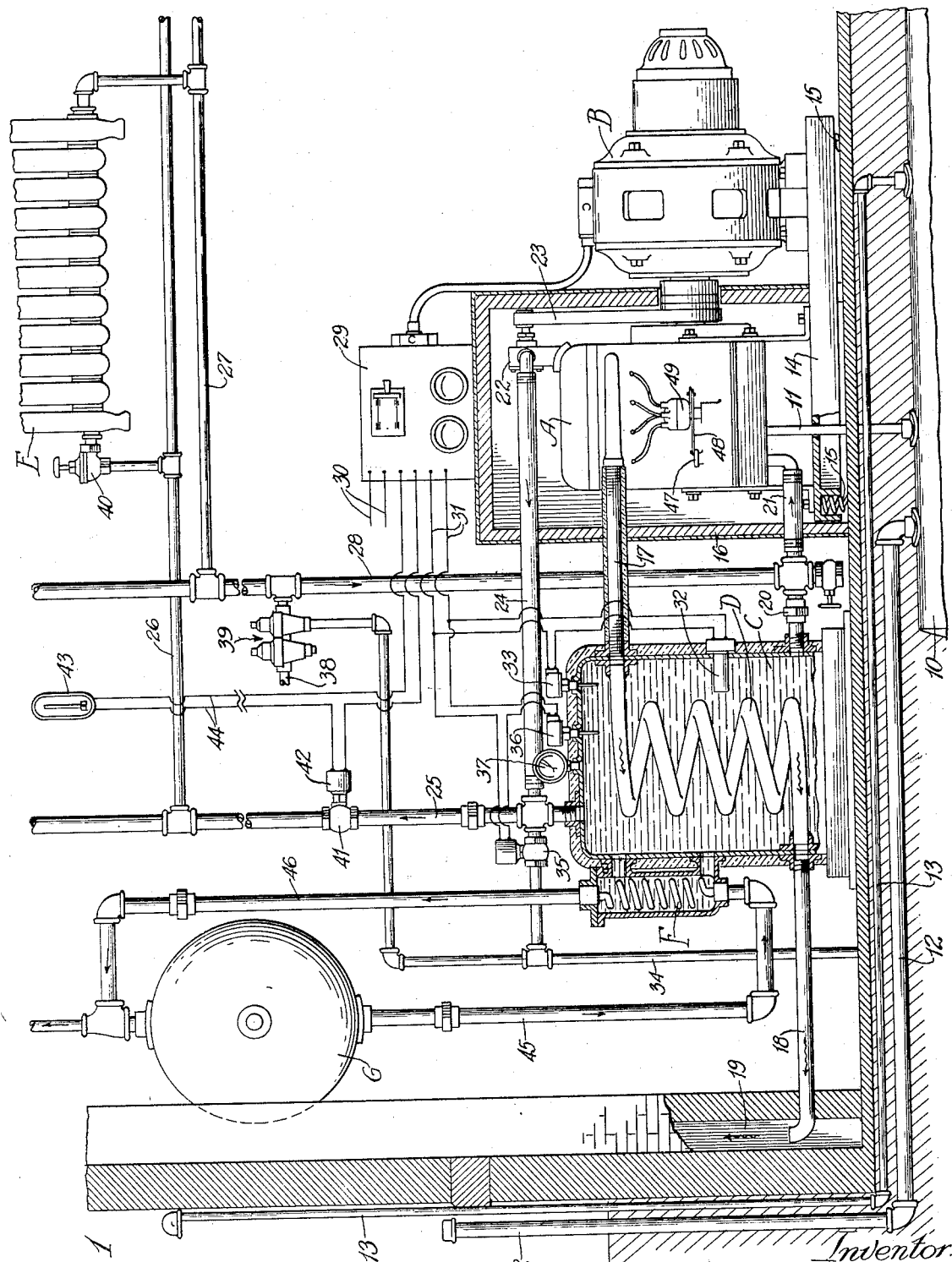

2,051,240

UNITED STATES PATENT OFFICE 2,051,240

HEATING AND LIGHTING EQUIPMENT

Harry H. Berryman, Elmhurst, Ill.

Application February 10, 1934, Serial No. 710,601

REISSUED
SEP 24 1940

1 Claim. (Cl. 290—2)

An object of this invention is to provide an efficient form of heating, power and lighting equipment for houses and small buildings of various kinds.

Another object is to combine such equipment with either hot water or steam heating apparatus, as well as providing hot water for domestic use.

These and other objects, as will hereinafter appear, are accomplished by this invention which is fully described in the following specification and shown in the accompanying drawing, in which—

The figure is a side elevation partly in section showing the heating and lighting equipment applied to a hot water heating system.

The embodiment illustrated comprises essentially an internal combustion engine A located preferably in the basement of the building to be heated, and adapted to drive an electric generator B, preferably of the alternating current type, the water from the cooling jacket of the engine being drawn from the bottom of a heating tank C and returned to the top of the same, the water in this tank also being heated by the exhaust gases from the engine passing through a coil D in the tank, the hot water from the top of the water tank C passing to heating coils E for heating rooms in a well known manner. Water for domestic use is also heated in a heat transfer coil F and stored in a hot water storage tank G.

The engine A preferably runs continuously at substantially uniform speed and has a storage battery (not shown) for supplying electric current for the ignition. This engine will operate successfully on kerosene or distillate which is stored in an underground tank 10 and carried to the carburetor of the engine through a pipe 11. This tank is filled from out of doors through a filling pipe 12, the tank being vented to the atmosphere through a pipe 13. The engine and generator are preferably mounted on a suitable base 14 which is mounted on springs 15 to absorb vibration of the engine and to prevent noise. The engine is also preferably enclosed in a cabinet or room 16 which is rendered substantially sound proof. A flexible metal exhaust pipe 17 extends through the side of this cabinet and connects with the coil D, the opposite end of the coil connecting through a pipe 18 with the stack 19 through which the exhaust gas is passed to the atmosphere.

The bottom of the tank C connects through suitable pipes or fittings 20 and a flexible hose 21 with the bottom of the engine cooling jacket, the top of the jacket leading to a pump 22 which is driven in any suitable manner, as by means of a belt 23, from the engine crank shaft. A flexible hose 24 leads from the pump 22 to a riser 25 which leads into the top of the water tank C. Thus when the engine is running a continuous stream of water passes from the bottom of the tank C through the engine cooling jacket and back to the top of the tank, thus heating the water in the tank. The riser 25 extends vertically and has lateral pipes 26 for carrying water to the various radiators E, the return from these radiators (of which only one is shown) being through pipes 27, 28, and 29.

Electric current from the generator B is carried to a suitable switchboard 29 which has a distributing line 30 for furnishing power and light to the building. Connected to this is a line 31 which connects to an electric heating unit 32 which extends into the tank C so as to heat the water therein, this heating unit being connected in series circuit with an aquastat 33 of a well known type which is set to close the circuit 31 through the heating coil 32 when the temperature of the water in the top of the tank falls below 180° F. and to open when the temperature of this water reaches 190° F.

A drain pipe 34 connects through an electrically operated valve 35 with the riser 25 and leads to a drain, not shown. The electric control for the valve 35 connects with the line 31 through an aquastat 36 which is set to open the valve 35 when the temperature of the water in the top of the tank exceeds 200° F., and to close this valve again when the temperature of this water falls to say 190° F. The temperature and pressure of the water in the top of the tank C is shown by a combination pressure gauge and thermometer 37. The water in the tank C is supplied through a pipe 38 and controlled by means of an automatic water feeder 39 of a well known type.

The temperature of each individual radiator E may be controlled by means of a valve 40 connected to each radiator, and the water flowing to all the radiators may be controlled by means of a valve 41 operated by an electric coil 42 connected in series circuit with a thermostat 43 located in some convenient part of the building and connected through a line 44 with the generator. Thus when the temperature at the thermostat exceeds a predetermined amount, the coil 42 closes the valve 41 thereby preventing hot water from passing up the riser 25 to the radiators. The thermostat 43 will be set to open and close on a temperature differential of 2 to 3 degrees Fahrenheit so as to maintain a substantially uniform temperature.

Hot water for domestic use is stored in the tank G which has a pipe 45 leading to the bottom of the heat transfer coil F, the top of this coil connecting through a pipe 46 with the top of the tank G. The coil F may be located in the tank C or closely adjacent thereto so as to be surrounded with hot water from the tank. The heat of this water is transferred to the coil F, thereby heating the water within the coil which rises by convection producing a circulation down through the pipe 45 and up through the pipe 46, as indicated by arrows.

When the water in the tank C is quite cold it is desirable that its temperature should be brought up rapidly, and for this purpose I have provided a temperature controlled mechanism, not shown in detail, having a lever 47 connected through a link 48 with the engine distributor 49, so that when the water is cold the distributor will be rotated so as to retard the spark sufficiently to materially increase the amount of heat transferred to the jacket water without, however, materially decreasing the speed of the engine. In this way the temperature of the water in the tank C will rapidly be brought up to a normal temperature of 180° to 190° F. at the top of the tank. As soon as the water at the bottom of the tank reaches a predetermined value the lever 47 will swing back, thereby advancing the spark to its normal operating position.

It will be apparent from the foregoing that a very complete and self-contained apparatus has been provided which furnishes electric light and power for the house or building, and which at the same time heats the building and provides an abundance of hot water for use therein.

While I have shown and described but a few embodiments of my invention, it is to be understood that it is capable of many modifications. Changes, therefore, in the construction and arrangement may be made which do not depart from the spirit and scope of the invention as disclosed in the appended claim.

I claim:

In combination, an electric generator for furnishing light and power for a building, an internal combustion engine for driving the generator, a storage tank for storing hot water for domestic purposes, means including a heating tank for utilizing the waste heat of the engine to heat the water in the storage tank, the engine having a distributor with a spark advance, means controlled by the heat of the cooling water of the engine for controlling the degree of spark advance.

HARRY H. BERRYMAN.